(12) United States Patent
Schumann et al.

(10) Patent No.: US 9,573,491 B2
(45) Date of Patent: Feb. 21, 2017

(54) LONGITUDINAL ADJUSTER FOR A VEHICLE SEAT, AND VEHICLE SEAT

(71) Applicant: JOHNSON CONTROLS COMPONENTS GMBH & CO. KG, Kaiserslautern (DE)

(72) Inventors: Kai Schumann, Rieschweiler (DE); Peter Reimer, Ramsen (DE); Ingo Teufel, Rockenhausen (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 14/783,115

(22) PCT Filed: Apr. 4, 2014

(86) PCT No.: PCT/EP2014/056812
§ 371 (c)(1),
(2) Date: Oct. 8, 2015

(87) PCT Pub. No.: WO2014/166833
PCT Pub. Date: Oct. 16, 2014

(65) Prior Publication Data
US 2016/0068082 A1 Mar. 10, 2016

(30) Foreign Application Priority Data

Apr. 9, 2013 (DE) .......................... 10 2013 206 251
May 2, 2013 (DE) .......................... 10 2013 208 003

(51) Int. Cl.
*F16M 13/00* (2006.01)
*B60N 2/07* (2006.01)
*B60N 2/12* (2006.01)

(52) U.S. Cl.
CPC .......... *B60N 2/0722* (2013.01); *B60N 2/0705* (2013.01); *B60N 2/0715* (2013.01); *B60N 2/12* (2013.01); *B60N 2205/20* (2013.01)

(58) Field of Classification Search
CPC ... B60N 2/0705; B60N 2/0715; B60N 2/0722; B60N 2/12
(Continued)

(56) References Cited

U.S. PATENT DOCUMENTS 8,172,192 B2 * 5/2012 Hofmann ............. B60N 2/0705
248/424

FOREIGN PATENT DOCUMENTS

DE 10 2004 038 507 A1 2/2006
DE 20 2006 016 652 U1 3/2008
(Continued)

*Primary Examiner* — Todd M Epps
(74) *Attorney, Agent, or Firm* — McGlew and Tuttle, P.C.

(57) ABSTRACT

A vehicle seat longitudinal adjuster includes a lower rail (5) and an upper rail (3) which is guided therein such that it can be displaced in the longitudinal direction, and at least one bearing element (30) which is arranged between the upper rail (3) and the lower rail (5) and is in contact with the upper rail (3) and the lower rail (5). At least one additional supporting element (20) is provided which is in contact with the upper rail (3) and the lower rail (5) and has a rotatable supporting roller (22). The supporting roller (22) can be rotated about a rotational axis (A) which runs in the vertical direction. The at least one supporting element (20) includes a supporting spring (26) which loads the supporting roller (22) in the vertical direction. A vehicle seat (1) with the longitudinal adjuster is also provided.

20 Claims, 4 Drawing Sheets

(58) Field of Classification Search
USPC .......... 248/424, 429, 430; 296/65.11, 65.13
See application file for complete search history.

(56) References Cited

FOREIGN PATENT DOCUMENTS

DE  10 2011 011 766 A1  8/2012
EP       0 067 123 A1  12/1982
GB         388 339 A   2/1933

\* cited by examiner

LONGITUDINAL ADJUSTER FOR A VEHICLE SEAT, AND VEHICLE SEAT

CROSS REFERENCE TO RELATED APPLICATIONS

This application is a United States National Phase Application of International Application PCT/EP2014/056812 filed Apr. 4, 2014 and claims the benefit of priority under 35 U.S.C. §119 of German Patent Applications 10 2013 206 251.6 filed Apr. 9, 2013 and 10 2013 208 003.4 filed May 2, 2013 the entire contents of which are incorporated herein by reference.

FIELD OF THE INVENTION

The invention relates to a longitudinal adjuster for a vehicle seat having a lower rail and an upper rail which is guided therein such that it can be displaced in the longitudinal direction, as well as at least one bearing element which is arranged between the upper rail and the lower rail and is in contact with the upper rail and the lower rail, wherein at least one additional supporting element is provided that is in contact with the upper rail and the lower rail and having a rotatable supporting roller. The invention further relates to a vehicle seat having the longitudinal adjuster features.

BACKGROUND OF THE INVENTION

A generic longitudinal adjuster and a generic vehicle seat are disclosed in DE 10 2011 011 766 A1. The longitudinal adjuster comprises two rail pairs with in each case two seat rails which are displaceable relative to one another, namely an upper rail and a lower rail which mutually encompass one another. The upper rail is able to be displaced relative to the lower rail within a comfort adjustment region and moreover into an easy entry position.

Bearing elements are provided between the upper rail and the lower rail, said bearing elements preferably comprising ball cages consisting of plastics material and metal balls rotatably mounted therein. The ball cages in this case are arranged in the intermediate spaces between the upper rail and the lower rail, wherein the balls are in contact with the upper rail and with the lower rail. During a displacement of the upper rail relative to the lower rail, the balls roll thereon.

The spacing of the first ball relative to the last ball of the ball cage defines the support length between the upper rail and the lower rail. The first ball and the last ball are generally arranged in the vicinity of the ends of the ball cage. Thus, the length of the ball cage approximately corresponds to the support length between the upper rail and the lower rail. The greater the support length, the greater the rigidity of the longitudinal adjuster.

With a displacement of the upper rail relative to the lower rail by a predetermined adjustment path, the ball cages move precisely by half of this adjustment path. The maximum possible length of the ball cages is thus defined by the length of the upper rail and the lower rail and by the maximum adjustment path. As a result, the support length and the rigidity of the longitudinal adjuster are also limited.

A high degree of rigidity of the longitudinal adjuster also causes a high natural frequency of the vehicle seat. Here, the highest possible natural frequency of the vehicle seat is desirable, so that low frequency excitations through the chassis of the vehicle which are transmitted to the vehicle seat do not lead to a build-up and thus to troublesome noises or vibrations. The noises may occur primarily with an empty vehicle seat, i.e. not occupied by an occupant.

A longitudinal adjuster for a vehicle seat is disclosed in DE 20 2006 016 652 U1 and which, on the one hand, comprises rotatable balls arranged between the upper rail and the lower rail and, on the other hand, cylindrical rollers mounted on the lower rail.

A longitudinal adjuster for a vehicle seat is disclosed in EP 0 067 123 A1 and which also comprises rotatable balls arranged between the upper rail and the lower rail and additionally cylindrical guide rollers which are rotatable about an axis extending in the transverse direction.

A roller guide for a vehicle seat is disclosed in DE 10 2004 038 507 A1. The roller guide comprises a guide roller which is rotatably mounted about an axis extending in the transverse direction, said guide roller rolling on a guide rail.

SUMMARY OF THE INVENTION

An object of the invention is to improve a longitudinal adjuster as well as a vehicle seat of the type mentioned in the introduction, in particular the rigidity of the longitudinal adjuster and thus to increase the natural frequency of the vehicle seat.

A generic longitudinal adjuster for a vehicle seat comprises a lower rail and an upper rail which is guided therein such that it can be displaced in the longitudinal direction, as well as at least one bearing element which is arranged between the upper rail and the lower rail and is in contact with the upper rail and the lower rail, wherein at least one additional supporting element is provided, said supporting element being in contact with the upper rail and the lower rail and having a rotatable supporting roller.

According to the invention, in this case the supporting roller can be rotated about a rotational axis which runs in the vertical direction and the at least one supporting element comprises a supporting spring which loads the supporting roller in the vertical direction.

The supporting element thus defines an additional support point between the upper rail and the lower rail which is spaced apart from the bearing element. The support length thus approximately corresponds to the spacing between the supporting element and the front support point formed by the bearing element. The front support point of the bearing element is located in the vicinity of the end of the bearing element remote from the supporting element. Thus, the support length and thus also the rigidity of the longitudinal adjuster are increased.

As the rotatable supporting roller defines the additional support point, a relatively small amount of friction is produced if the upper rail or the lower rail slides along the supporting element, and the supporting roller rolls on the upper rail or on the lower rail. As the supporting spring acts upon the supporting roller in the vertical direction, it is possible to compensate for production tolerances in the upper rail or the lower rail as well as in the supporting element, and it is ensured that the supporting element is constantly in contact with the upper rail and the lower rail.

Advantageously, the at least one supporting element is arranged in a rear region of the longitudinal adjuster in the direction of travel. As a result, the support length of the longitudinal adjuster is increased if the bearing element is located in a front region of the longitudinal adjuster in the direction of travel. If the bearing element is located in a front region of the longitudinal adjuster in the direction of travel, the upper rail is able to be displaced relative to the lower rail within a comfort adjustment region and also into an easy entry position.

Preferably a plurality of, in particular two, supporting elements are provided, wherein the two supporting elements are preferably arranged one behind the other in the direction of travel.

According to an advantageous embodiment of the invention, the supporting spring has an approximately hollow cylindrical base body, a plurality of spring arms protruding therefrom, preferably in the axial direction or in the radial direction or in the radial and axial direction.

According to a further advantageous embodiment of the invention, the supporting spring is designed as a wave spring.

The supporting roller preferably has a surface which is inclined relative to the vertical direction, the support point additionally defined by the supporting roller being located thereon.

Preferably, the at least one supporting element is arranged on the lower rail and is thus fixed to the vehicle.

Advantageously, the at least one supporting element is arranged eccentrically to the lower rail in the transverse direction. As a result, during a displacement relative to the lower rail, the upper rail comes into contact with the supporting roller of the supporting element only in the transverse direction on one side. A rotation of the supporting roller about the rotational axis extending in the vertical direction is permitted thereby.

The supporting roller is preferably rotatably mounted on a bearing pin of circular cylindrical design, the central axis thereof being aligned with the rotational axis.

Preferably the supporting element is constructed such that the bearing pin penetrates the supporting spring.

According to an advantageous development of the invention, the bearing pin is fastened to one of the rails, i.e. to the upper rail or to the lower rail, and has a flange-like widened portion at its end remote from this rail. The flange-like widened portion prevents the supporting roller from being further forced away from the rail by the supporting spring.

According to an advantageous embodiment, a contact spacing is greater than a support width of the supporting roller. The contact spacing is in this case the spacing between the support point of the upper rail on the supporting roller and the rotational axis of the supporting roller.

The support width is the extension of the supporting roller in the vertical direction. As a result, a tilting moment acts on the supporting roller, said tilting moment acting upon the supporting roller relative to the bearing pin. As a result, the frictional force which acts in the vertical direction between the bearing pin and the supporting roller is increased and the rigidity of the longitudinal adjuster is further increased.

Moreover, according to an advantageous embodiment the contact spacing is greater than a support spacing of the supporting spring. The support spacing in this case is the spacing of the point of action of the supporting spring on the supporting roller relative to the rotational axis.

Preferably the supporting roller consists of a non-metal material, in particular made of plastics material. As a result, the supporting roller has a relatively low weight and a sufficiently high frictional value relative to the bearing pin and to the upper rail.

The object is achieved by a vehicle seat having the features cited in claim 15, said vehicle seat having at least one longitudinal adjuster according to the invention. The natural frequency of the vehicle seat is increased by the increased rigidity of the longitudinal adjuster.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 7:
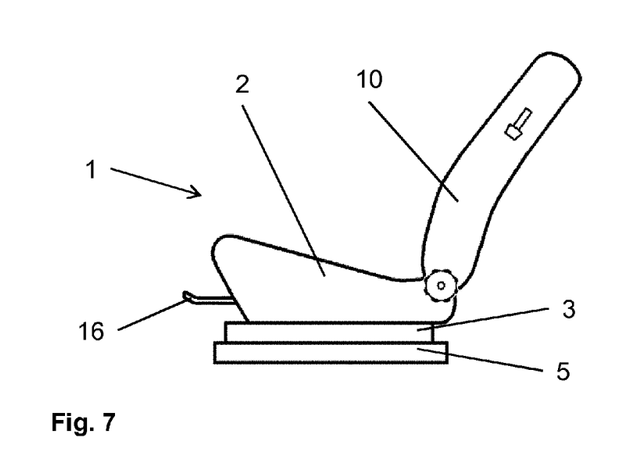
FIG. 7 is a schematic view of a vehicle seat.

A vehicle seat 1 for a motor vehicle, in the present case a rear seat, has a seat part 2 and a backrest 10 which is attached thereto and adjustable in inclination. The vehicle seat could, however, also be a front seat.

The arrangement of the vehicle seat 1 inside the vehicle and the usual direction of travel thereof define the directional information used hereinafter. In this case, a direction oriented perpendicular to the ground is denoted hereinafter as the vertical direction and a direction perpendicular to the vertical direction and perpendicular to the direction of travel is denoted hereinafter as the transverse direction.

A head restraint, not shown, is also attached to the upper end of the backrest 10 in the vertical direction, said upper end being remote from the seat part 2.

The vehicle seat 1 is longitudinally adjustable by means of a longitudinal adjuster which has two lower rails 5 connected to the vehicle floor of the motor vehicle as well as two upper rails 3. This means that the seat part 2 is able to be adjusted together with the backrest 10 in, and counter to, the longitudinal direction which in the present case corresponds to the direction of travel. To this end, each of the upper rails 3 is displaceably guided respectively in one of the lower rails 5 extending parallel in the longitudinal direction.

The directional information used, i.e. the vertical direction, direction of travel and transverse direction, which refer to the longitudinal adjuster and parts of the longitudinal adjuster, applies to a conventional arrangement of the longitudinal adjuster and the vehicle seat in the vehicle.

Each of the two upper rails 3 forms in each case a seat rail pair with the associated lower rail 5. The longitudinal adjuster thus comprises two seat rail pairs which are offset relative to one another in the transverse direction and which extend parallel to one another.

Figure 1:
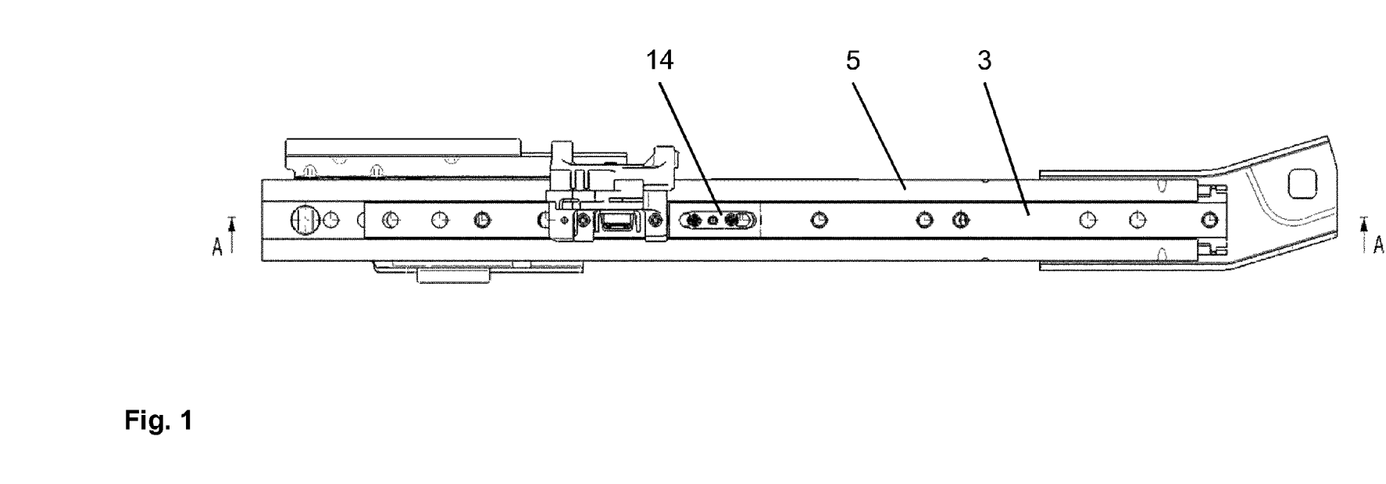
FIG. 1 is a plan view of a rail pair of a longitudinal adjuster in a rear adjusted position.
Figure 2:
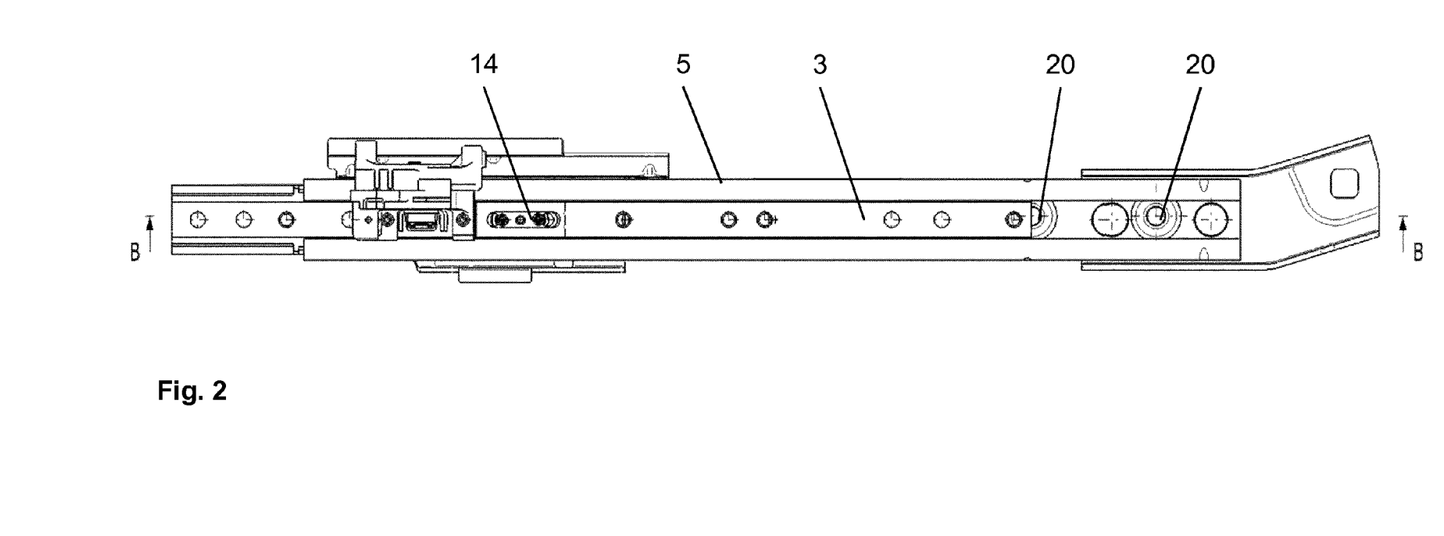
FIG. 2 is a plan view of the rail pair of the longitudinal adjuster in a front adjusted position.

By means of one respective locking device 14 each of the two upper rails 3 is able to be locked to the respective lower rail 5. By means of an unlocking lever 16, the locking devices 14 are able to be unlocked. Alternatively, an electrical drive is also conceivable.

In the present case, the two seat rail pairs are constructed to be mirror-symmetrical. Therefore, only one seat rail pair of the longitudinal adjuster is described in detail hereinafter.

Bearing elements are arranged between the upper rail 3 and the lower rail 5, said bearing elements in the present case comprising ball cages 30 consisting of plastics material and a plurality of metal balls rotatably mounted therein. Also, other types of bearing elements are conceivable, for example in the form of cylindrical rollers or other rolling elements.

Figure 3:
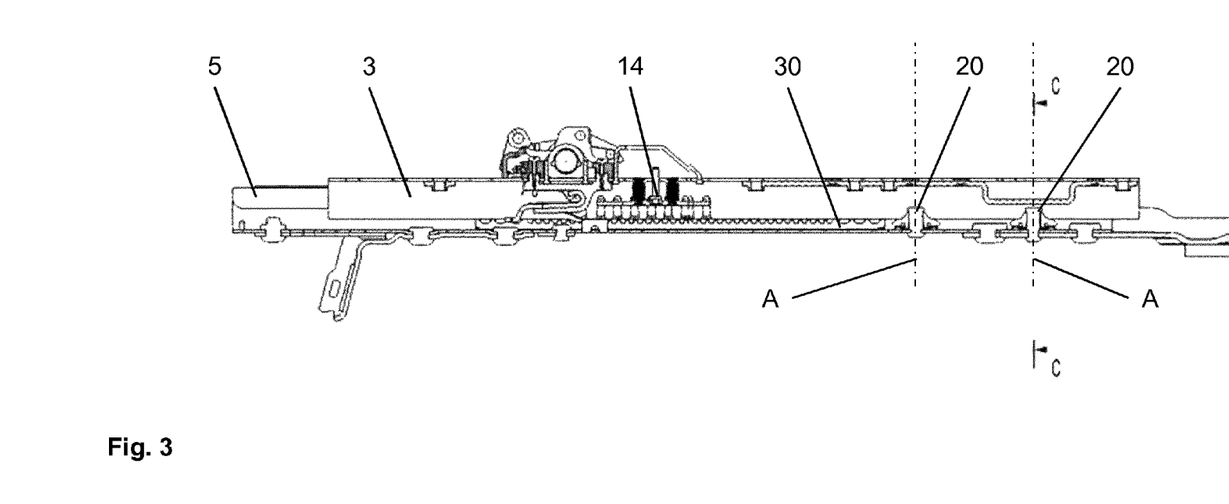
FIG. 3 is a section through the rail pair in the rear adjusted position along the cutting line A-A in FIG. 1.
Figure 4:
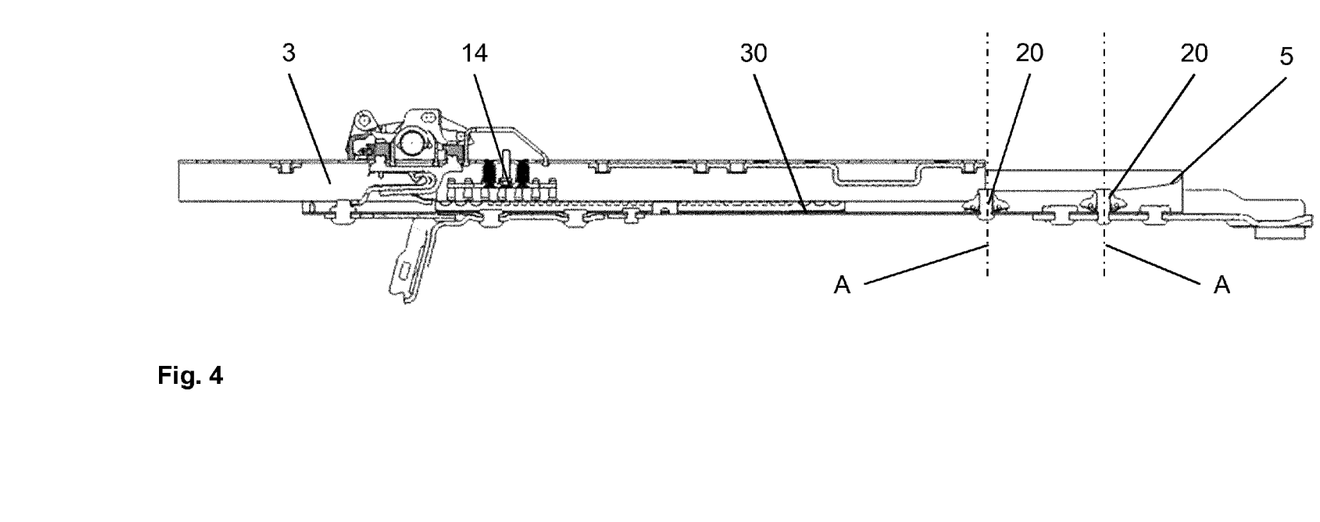
FIG. 4 is a section through the rail pair in the front adjusted position along the cutting line B-B in FIG. 2.

In the views according to FIG. 3 and FIG. 4, in each case a ball cage 30 is visible. The balls rotatably mounted in the ball cages 30 are in contact with the upper rail 3 and with the lower rail 5.

In the present case two supporting elements 20 are arranged in a rear region of the lower rail 5 in the direction of travel. In this case, each of the two supporting elements 20 comprises a supporting roller 22, a bearing pin 24 and a supporting spring 26. It is also conceivable to arrange one or both supporting elements 20 in a front region of the lower rail 5 in the direction of travel.

The two supporting elements 20 in the present case are arranged one behind the other in the direction of travel, wherein the supporting element 20 located to the front in the direction of travel is denoted as the front supporting element 20 and the supporting element located to the rear in the direction of travel 20 is denoted as the rear supporting element 20. It is also conceivable to arrange the two supporting elements 20 in the transverse direction or diagonally offset to one another.

The two supporting elements 20 in the present case are constructed identically, which is why only one of the supporting elements 20 is described in more detail hereinafter.

The bearing pin 24 has approximately the shape of a circular cylinder and is arranged on the lower rail 5 such that its central axis extends in the vertical direction. The bearing pin 24 is inserted into an opening in the lower rail 5 provided therefor and fastened there.

The views in FIG. 1, FIG. 2, FIG. 3, FIG. 4 and FIG. 7 relate to the first exemplary embodiment and to the second exemplary embodiment.

Figure 5:
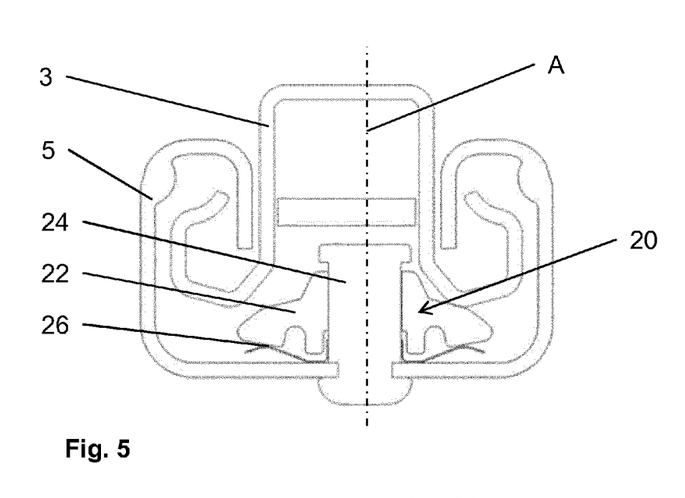
FIG. 5 is a section through a rail pair according to a first exemplary embodiment in the rear adjusted position along the cutting line C-C in FIG. 3.
Figure 6:
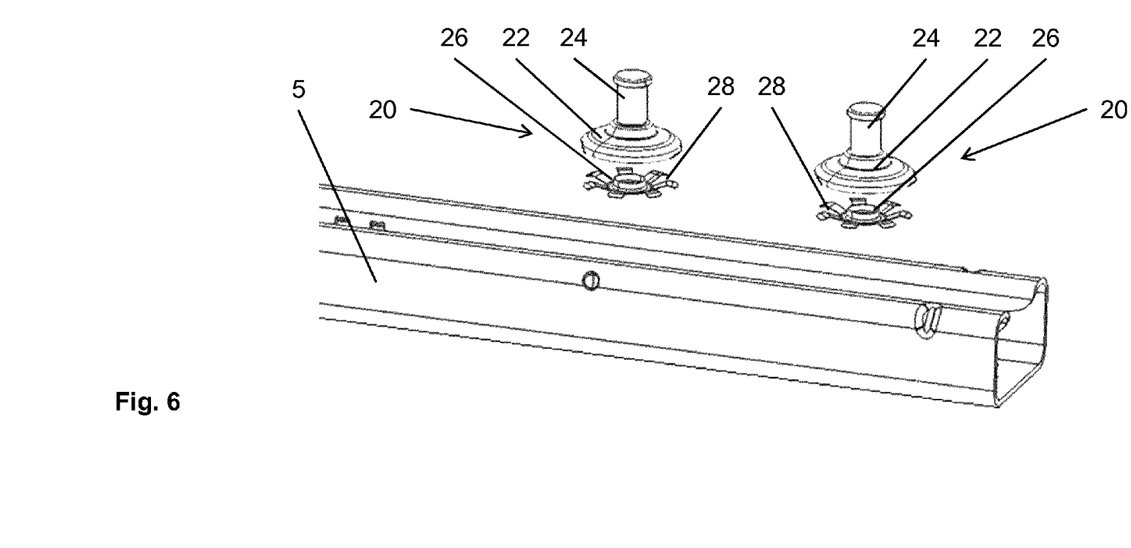
FIG. 6 is a partially exploded view of the rail pair of the first exemplary embodiment.

In a first exemplary embodiment shown in FIG. 5 and FIG. 6 the bearing pin 24 is riveted to the lower rail 5. In a second exemplary embodiment shown in FIG. 8 and FIG. 9, the bearing pin 24 is screwed by means of a nut 40 to the lower rail 5. Also other fastening possibilities, for example welding, are conceivable. In the second exemplary embodiment, moreover, an additional reinforcement clamp 42 is connected to the lower rail 5, which increases the rigidity of the rail pair.

The opening in the lower rail 5, in which the bearing pin 24 is inserted, is not located in the center of the lower rail 5 in the transverse direction but is arranged offset to the outside in the transverse direction. Thus, the bearing pin 24 and thus also its central axis, are arranged offset outwardly relative to the center of the lower rail 5 in the transverse direction.

The supporting roller 22, which has an inclined surface relative to the vertical direction, is rotatably mounted on the bearing pin 24 about the rotational axis A, wherein the internal diameter of the supporting roller 22 corresponds approximately to the external diameter of the bearing pin 24. The bearing pin 24 penetrates, therefore, the supporting roller 22 which in the present case consists of plastics material. The supporting roller 22 is thus rotatable about the central axis of the bearing pin 24 extending in the vertical direction, which is aligned with the rotational axis A of the supporting roller 22. Thus, the rotational axis A of the supporting roller 22 is also offset outwardly relative to the center of the lower rail 5 in the transverse direction.

The upper rail 3 at its rear end in the direction of travel, in the lower region in the vertical direction, has a chamfer, i.e. an oblique portion extending in an inclined manner relative to the vertical direction and in an inclined manner relative to the direction of travel.

The supporting spring 26, according to the first exemplary embodiment shown in FIG. 5 and FIG. 6, comprises an approximately hollow cylindrical base body, a plurality of spring arms 28 protruding therefrom in the radial and axial direction. In this case, the spring arms 28 initially protrude in the radial direction from the base body and in the further extension thereof are curved in the axial direction. The bearing pin 24 penetrates the supporting spring 26 in a similar manner to the supporting roller 22, wherein the internal diameter of the base body of the supporting spring 26 corresponds approximately to the external diameter of the bearing pin 24.

According to the first exemplary embodiment, the supporting spring 26 is arranged in the vertical direction below the supporting roller 22, i.e. axially offset, and is supported on the lower rail 5, in the present case by its base body. The spring arms 28 protrude radially outwardly and in the vertical direction upwardly from the base body and act upon the supporting roller 22 upwardly in the vertical direction. The supporting spring 26 may also have the shape of a resilient element of different configuration.

Figure 8:
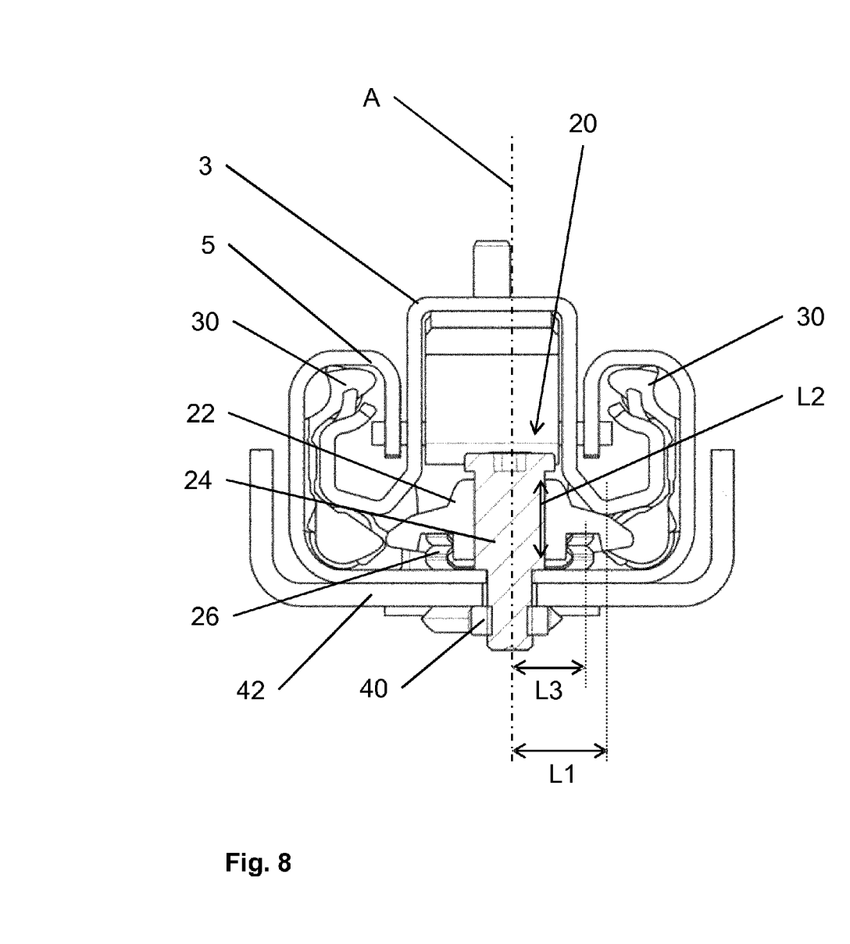
FIG. 8 is a section through a rail pair according to a second exemplary embodiment in the rear adjusted position along the cutting line C-C in FIG. 3.
Figure 9:
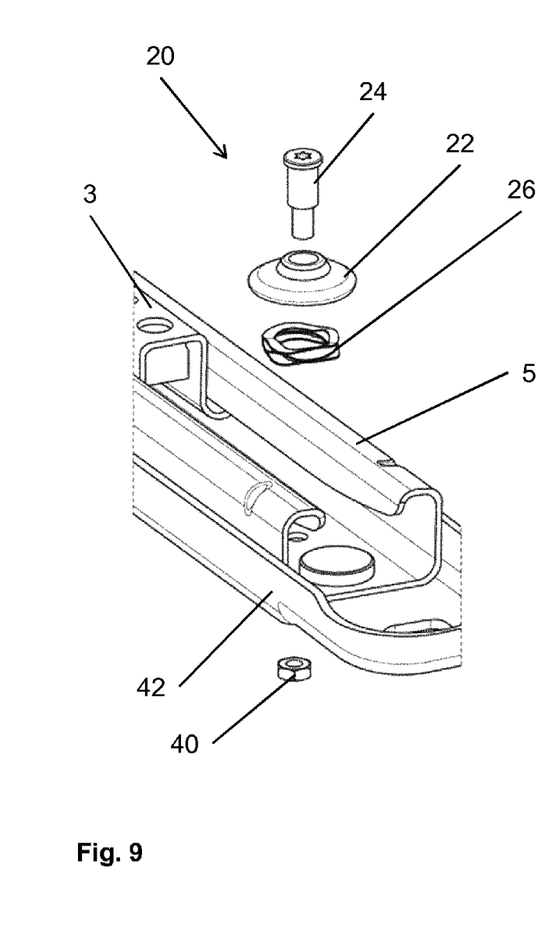
FIG. 9 is a partially exploded view of the rail pair of the second exemplary embodiment.

For example, the supporting spring 26 according to the second exemplary embodiment is configured as a wave spring and has an approximately hollow cylindrical base body made of a wound flat material. The bearing pin 24 penetrates the supporting spring 26 which is arranged in the vertical direction below the supporting roller 22, i.e. axially offset thereto. The supporting spring 26 acts upon the supporting roller 22 upwardly in the vertical direction.

At its upper end in the vertical direction the bearing pin 24 has a flange-like widened portion which prevents the supporting roller 22 from being forced further upward by the spring force applied by the spring arms 28 or the supporting spring 26. The supporting roller 22 is, therefore, tensioned between the flange-like widened portion of the bearing pin 24 and the supporting spring 26, as long as no contact exists with the upper rail 3.

If the longitudinal adjuster is in a rear adjusted position, as shown in FIG. 1, FIG. 3, FIG. 5 and FIG. 8, a lateral region of the upper rail 3 is in contact with the supporting rollers 22 of the two supporting elements 20. In this case, the upper rail 3 presses the supporting rollers 22 counter to the spring force applied by the supporting spring 26, downwardly in the vertical direction. Both supporting elements 20 thus support the upper rail 3 in the direction of travel in a rear region and at the same time act upon the upper rail 3 in the vertical direction.

According to the second exemplary embodiment and shown in FIG. 8, the supporting roller 22 in the vertical direction has an expanded portion which is denoted as the support width L2. The support point of the upper rail 3 on the supporting roller 22 is located at a contact spacing L1 from the rotational axis A. Here, the contact spacing L1 in the present case is greater than the support width L2 of the supporting roller 22.

According to the second exemplary embodiment and also shown in FIG. 8, the supporting spring 26 acts on the supporting roller 22 in a support spacing L3 from the rotational axis A. Here, the contact spacing L1 in the present case is greater than the support spacing L3 of the supporting spring 26.

If the upper rail 3 is locked to the lower rail 5, and in contact with the supporting roller 22, due to the described geometric design and arrangement of the supporting element 20 according to the second exemplary embodiment a tilting movement acts on the supporting roller 22, said tilting moment acting upon the supporting roller 22 relative to the bearing pin 24. As a result, the frictional force which acts between the bearing pin 24 and the supporting roller 22 in the vertical direction is increased. As a result, the rigidity of the longitudinal adjuster is further increased.

If the longitudinal adjuster is in the rear adjusted position, the support length between the upper rail 3 and the lower rail 5 corresponds approximately to the spacing between the front end of the ball cage 30 and the rear supporting element 20 in the direction of travel.

If, starting from the rear adjusted position, the upper rail 3 is displaced to the front relative to the lower rail 5, toward a front adjusted position, the upper rail 3 initially remains in contact with the rear supporting element 20 whilst the ball cage 30 moves forward. The support length between the upper rail 3 and the lower rail 5 thus initially increases.

With the movement of the upper rail 3 to the front, said upper rail remains, as already mentioned, in contact with the supporting roller 22 and thereby causes a rotation of the supporting roller 22 about its rotational axis A extending in the vertical direction. The supporting roller 22 thus rolls along the upper rail 3 on said upper rail.

According to the second exemplary embodiment, with a rotation of the supporting roller 22 caused thereby, the frictional force which acts between the bearing pin 24 and the supporting roller 22 in the vertical direction is reduced. As a result, the required displacement force of the upper rail 3 is also reduced. In the present case, the surface of the supporting roller 22 facing the upper rail 3 is profiled, whereby the contact of the supporting roller 22 relative to the upper rail 3 is improved.

If the longitudinal adjuster according to a predetermined adjustment path reaches a central adjusted position, the upper rail 3 leaves the rear supporting element 20 and from then on is only in contact with the front supporting element 20. The support length between the upper rail 3 and the lower rail 5 then corresponds approximately to the spacing between the front end of the ball cage 30 in the direction of travel and the front supporting element 20. The ball cage 30, however, in the central adjusted position is located further to the front than in the rear adjusted position.

If, starting from the central adjusted position, the upper rail 3 is now displaced further to the front relative to the lower rail 5, in the direction of the front adjusted position, the upper rail 3 remains in contact with the front supporting element 20 whilst the ball cage 30 moves to the front. The support length between the upper rail 3 and the lower rail 5 thus increases again.

If the longitudinal adjuster is in the front adjusted position, as shown in FIG. 2 and FIG. 4, a lateral region of the upper rail 3 is in contact with the supporting roller 22 of the front supporting element 20 in the direction of travel. In this case, the upper rail 3 forces the supporting roller 20 counter to the spring force applied by the supporting spring 26 downwardly in the vertical direction and the front supporting element 20 thus supports the upper rail 3 in the direction of travel in a rear region. Thus, no contact is present between the upper rail 3 and the rear supporting roller 20.

If the longitudinal adjuster is in the front adjusted position, the support length between the upper rail 3 and the lower rail 5 approximately corresponds to the spacing between the front end of the ball cage 30 in the direction of travel and the front supporting element 20. In the front adjusted position the ball cage 30 in this case is located further to the front than in the central adjusted position.

If, starting from the front adjusted position, the upper rail 3 relative to the lower rail 5 is now displaced further forward, i.e. beyond the front adjusted position into an easy entry position, the upper rail 3 also leaves the front supporting element 20. If the longitudinal adjuster is in the easy entry position, the support length between the upper rail 3 and the lower rail 5 approximately corresponds to the length of the ball cage 30.

If the upper rail 3 is displaced from the easy entry position counter to the direction of travel to the rear, the rear end of the upper rail 3 again comes into contact with the supporting roller 22 of the front supporting element 20. In this case, the chamfer located on the rear end of the upper rail 3 strikes the surface of the supporting roller 22 extending in an inclined manner relative to the vertical direction, whereby the process of the upper rail 3 coming into contact with the supporting roller 22 is facilitated and the displacement force required for moving the upper rail 3 is reduced.

It is also conceivable to provide a supporting element 20, or a plurality of supporting elements 20, which have no rotatable rollers but, for example, a slider, preferably with an at least partially inclined surface. In this case, the upper rail 3 is not in rolling contact but in sliding contact with the supporting element 20.

The features disclosed in the above description, the claims and the drawings may be of significance both individually and in combination for implementing the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:
   a lower rail;
   an upper rail guided in the lower rail such that the upper rail can be displaced in a longitudinal direction;
   at least one bearing element arranged between the upper rail and the lower rail and in contact with the upper rail and the lower rail; and
   at least one supporting element in contact with the upper rail and the lower rail and comprising a rotatable supporting roller that is rotatable about a rotational axis that extends in a lateral direction and the at least one supporting element further comprises a supporting spring which loads the supporting roller in the lateral direction.

2. The longitudinal adjuster as claimed in claim 1, wherein the at least one supporting element is arranged in a rear region of the longitudinal adjuster in a direction of travel.

3. The longitudinal adjuster as claimed in claim 1, further comprising at least an additional supporting element to provide a plurality of supporting elements, said supporting elements being arranged one behind another in a direction of travel.

4. The longitudinal adjuster as claimed in claim 1, wherein the supporting spring has an approximately hollow cylindrical base body, a plurality of spring arms protruding therefrom in a radial or axial direction.

5. The longitudinal adjuster as claimed in claim 1, wherein the supporting spring is designed as a wave spring.

6. The longitudinal adjuster as claimed in claim 1, wherein the supporting roller has a surface which is inclined relative to a vertical direction.

7. The longitudinal adjuster as claimed in claim 1, wherein the at least one supporting element is arranged on the lower rail.

8. The longitudinal adjuster as claimed in claim 7, wherein the at least one supporting element is arranged eccentrically to the lower rail in a transverse direction.

9. The longitudinal adjuster as claimed in claim 1, wherein the supporting roller is rotatably mounted on a bearing pin of circular cylindrical design, the central axis thereof being aligned with the rotational axis.

10. The longitudinal adjuster as claimed in claim 9, wherein the bearing pin penetrates the supporting spring.

11. The longitudinal adjuster as claimed in claim 9, wherein the bearing pin is fastened to one of the rails and has a flange-like widened portion at its end remote from the rail.

12. The longitudinal adjuster as claimed in claim 1, wherein a contact spacing is greater than a support width of the supporting roller.

13. The longitudinal adjuster as claimed in claim 1, wherein a contact spacing is greater than a support spacing of the supporting spring.

14. The longitudinal adjuster as claimed in claim 1, wherein the supporting roller is formed of a plastic material.

15. A vehicle seat comprising at least one longitudinal adjuster, the longitudinal adjuster comprising:
a lower rail;
an upper rail guided in the lower rail such that the upper rail can be displaced in a longitudinal direction;
at least one bearing element arranged between the upper rail and the lower rail and in contact with the upper rail and the lower rail; and
at least one supporting element in contact with the upper rail and the lower rail and comprising a rotatable supporting roller that is rotatable about a rotational axis that extends in a lateral direction and the at least one supporting element further comprises a supporting spring which loads the supporting roller in the lateral direction.

16. The vehicle seat as claimed in claim 15, wherein the at least one supporting element is arranged in a rear region of the vehicle seat in a direction of travel.

17. The vehicle seat as claimed in claim 15, further comprising at least an additional supporting element to provide a plurality of supporting elements, said supporting elements being arranged one behind another in a direction of travel.

18. The vehicle seat as claimed in claim 15, wherein the supporting spring has an approximately hollow cylindrical base body, a plurality of spring arms protruding therefrom in a radial all or axial direction.

19. The vehicle seat as claimed in claim 15, wherein the supporting spring comprises a wave spring.

20. The vehicle seat as claimed in claim 15, wherein the supporting roller has a surface which is inclined relative to a vertical direction.

* * * * *